(12) United States Patent
Chiu et al.

(10) Patent No.: US 10,991,156 B2
(45) Date of Patent: Apr. 27, 2021

(54) MULTI-MODAL DATA FUSION FOR ENHANCED 3D PERCEPTION FOR PLATFORMS

(71) Applicant: SRI International, Menlo Park, CA (US)

(72) Inventors: Han-Pang Chiu, West Windsor, NJ (US); Supun Samarasekera, Skillman, NJ (US); Rakesh Kumar, West Windsor, NJ (US); Bogdan C. Matei, Princeton, NJ (US); Bhaskar Ramamurthy, Los Altos, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 16/523,313

(22) Filed: Jul. 26, 2019

(65) Prior Publication Data

US 2020/0184718 A1 Jun. 11, 2020

Related U.S. Application Data

(60) Provisional application No. 62/775,531, filed on Dec. 5, 2018.

(51) Int. Cl.
*G06K 9/62* (2006.01)
*G06T 17/05* (2011.01)
(Continued)

(52) U.S. Cl.
CPC ............ *G06T 17/05* (2013.01); *G06K 9/6288* (2013.01); *G06T 7/11* (2017.01); *G06T 7/20* (2013.01);
(Continued)

(58) Field of Classification Search
None
See application file for complete search history.

(56) References Cited

U.S. PATENT DOCUMENTS 6,956,469 B2 10/2005 Hirvonen et al.
7,187,809 B2 3/2007 Zhao et al.
(Continued)

OTHER PUBLICATIONS

Berrio, Julie Stephany, Wei Zhou, James Ward, Stewart Worrall, and Eduardo Nebot. "Octree map based on sparse point cloud and heuristic probability distribution for labeled images." In 2018 IEEE/RSJ International Conference on Intelligent Robots and Systems (IROS), pp. 3174-3181. IEEE, Oct. 1, 2018. (Year: 2018).*
(Continued)

*Primary Examiner* — Steven Z Elbinger
(74) *Attorney, Agent, or Firm* — Moser Taboada

(57) ABSTRACT

A method for providing a real time, three-dimensional (3D) navigational map for platforms includes integrating at least two sources of multi-modal and multi-dimensional platform sensor information to produce a more accurate 3D navigational map. The method receives both a 3D point cloud from a first sensor on a platform with a first modality and a 2D image from a second sensor on the platform with a second modality different from the first modality, generates a semantic label and a semantic label uncertainty associated with a first space point in the 3D point cloud, generates a semantic label and a semantic label uncertainty associated with a second space point in the 2D image, and fuses the first space semantic label and the first space semantic uncertainty with the second space semantic label and the second space semantic label uncertainty to create fused 3D spatial information to enhance the 3D navigational map.

20 Claims, 8 Drawing Sheets

(51) Int. Cl.
    *G06T 7/11* (2017.01)
    *G06T 7/20* (2017.01)
    *G06T 7/50* (2017.01)
    *G01S 13/42* (2006.01)
    *G01S 13/86* (2006.01)

(52) U.S. Cl.
    CPC ........... *G06T 7/50* (2017.01); *G01S 13/42* (2013.01); *G01S 13/865* (2013.01); *G01S 13/867* (2013.01); *G06T 2207/10028* (2013.01); *G06T 2207/20081* (2013.01); *G06T 2207/20221* (2013.01); *G06T 2207/30252* (2013.01)

(56) References Cited

U.S. PATENT DOCUMENTS

| | | | |
|---|---|---|---|
| 7,242,460 | B2 | 7/2007 | Hsu et al. |
| 7,925,049 | B2 | 4/2011 | Zhu et al. |
| 7,965,886 | B2 | 6/2011 | Han et al. |
| 8,174,568 | B2 | 5/2012 | Samarasekera et al. |
| 8,345,988 | B2 | 1/2013 | Shan et al. |
| 8,391,592 | B2 | 3/2013 | Han et al. |
| 8,761,439 | B1 | 6/2014 | Kumar et al. |
| 8,861,842 | B2 | 10/2014 | Jung et al. |
| 9,031,809 | B1 | 5/2015 | Kumar et al. |
| 9,476,730 | B2 | 10/2016 | Samarasekera et al. |
| 9,488,492 | B2 | 11/2016 | Samarasekera et al. |
| 10,089,751 | B1* | 10/2018 | Ter Beest, III .... G06K 9/00771 |
| 2015/0002636 | A1* | 1/2015 | Brown ................ H04N 13/356 348/47 |
| 2015/0269438 | A1* | 9/2015 | Samarasekera .... G06K 9/00637 382/154 |
| 2017/0085863 | A1* | 3/2017 | Lopez ................ H04N 13/122 |
| 2017/0293810 | A1* | 10/2017 | Allen ................ G06K 9/00791 |
| 2017/0341237 | A1* | 11/2017 | Jain ...................... H04N 13/271 |
| 2019/0051056 | A1 | 2/2019 | Chiu et al. |
| 2019/0114507 | A1 | 4/2019 | Chiu et al. |
| 2020/0043217 | A1* | 2/2020 | Cilingir ............... H04N 19/597 |
| 2020/0151512 | A1* | 5/2020 | Corral-Soto ......... G06K 9/6262 |

OTHER PUBLICATIONS

Levinson et al., "Robust Vehicle Localization in Urban Environments Using Probabilistic Maps", 2010 IEEE International Conference on Robotics and Automation, Anchorage Convention District, May 3-8, 2010, Anchorage, Alaska, USA, ; https://www.researchgate.net/publication/224156187.

Trhun et al., "How Google's Self-Driving Car Works", Google engineers explain the technology behind their self-driving car and show videos of road tests, 2011 IEEE Spectrum, International Conference on Intelligent Robots and Systems, p. 4, Oct. 18, 2011. http://spectrum.ieee.org/automaton/robotics/artificial-intelligence/how-google-self-driving-car-works.

Seff et al., "Learning from Maps: Visual Common Sense for Autonomous Driving", arXiv:1611.08583v1 [cs.CV] http://www.cs.princeton.edu/~aseff/mapnet. Nov. 25, 2016.

Oskiper et al., "[Poster] CamSLAM: Vision aided inertial tracking and mapping framework for large scale AR applications", https://www.researchgate.net/publication/320707201 Oct. 30, 2017.

Chiu et al., "Augmented Reality Driving Using Semantic Geo-Registration", 2018 IEEE Conference on Virtual Reality and 3D User Interfaces (VR), Mar. 18-22, 2018, Reutlingen, Germany, Citable Link http://hdl.handle.net/1721.1/119669.

* cited by examiner

INPUT PARTIAL SCAN     COMPLETED SCAN     PREDICTED SEMANTICS

MULTI-MODAL DATA FUSION FOR ENHANCED 3D PERCEPTION FOR PLATFORMS

CROSS-REFERENCE TO RELATED APPLICATIONS

This application claims priority to and the benefit of U.S. Provisional Patent Application Ser. No. 62/775,531, filed Dec. 5, 2018, which is incorporated herein by this reference in its entirety.

BACKGROUND

Self-driving vehicles utilize sensor information from their surroundings to determine control inputs in order to safely guide the vehicle through real world environments. The sensor information may also be used to determine a vehicle's orientation and position in a given environment. Images provided by sensors, like cameras, are processed and interpreted from the vehicle's frame of reference to generate a digital representation of the environment surrounding the vehicle. The digital representation is then used to create a mathematical map that includes digital constructions of objects from the real world. The map can then be used by the vehicle to derive a navigational path to a final destination.

As the speeds of the self-driving vehicles increase, objects in the real world approach the immediate environment of the vehicle much quicker, giving the vehicle less time to recognize the object and react with an appropriate control input. Sensors, such as cameras, provide very dense information close to the vehicle but at long range the information is very sparse. Some techniques to overcome this issue dictate that the vehicle travel a given course several times such that the entire course is densely mapped by cameras beforehand. However, this constricts the vehicle to only navigating known paths and does not account for ad hoc objects that may appear, such as pedestrians and other vehicles, leading to possible injuries by the vehicle or to occupants in the vehicle.

SUMMARY

Embodiments of the present principles generally relate to creating dense, three-dimensional navigational maps for platforms in real time.

In some embodiments, a method for providing a real time, three-dimensional (3D) navigational map for platforms may comprise integrating at least two sources of multi-modal and multi-dimensional platform sensor information to produce a more accurate 3D navigational map by receiving both a 3D point cloud from a first sensor on a platform with a first modality and a 2D image from a second sensor on the platform with a second modality different from the first modality; generating at least one first space semantic label and at least one first space semantic label uncertainty associated with at least one first space point in the 3D point cloud; generating at least one second space semantic label and at least one second space semantic label uncertainty associated with at least one second space point in the 2D image; and determining if the at least one first space point and the at least one second space point represent a common point in a space surrounding the platform and, if so, fusing the at least one first space semantic label and the at least one first space semantic label uncertainty with the at least one second space semantic label and the at least one second space semantic label uncertainty to create fused 3D spatial information to enhance the 3D navigational map.

In some embodiments, the method may further comprise fusing temporal or motion related information from the first sensor or the second sensor into the fused 3D spatial information, performing a subsequent fusion of geo-referenced data, distance information, or velocity information with the fused 3D spatial information to further enhance the 3D navigational map, periodically performing a joint inference on new and existing information from the first sensor and the second sensor to update the 3D navigational map, determining depth information from information from the first sensor or from information from the second sensor, fusing information from the first sensor and information from the second sensor using a joint deep-learning based 3D semantic segmentation process, using information from the first sensor and information from the second sensor to reason a complete and dense 3D scene by depth propagation or occlusion fill-in processes to enhance the 3D navigational map, localizing the 3D navigational map using a GPS source or an IMU source, using velocity information from a full motion video (FMV) LIDAR sensor to augment a motion estimation of the platform, periodically performing semantic segmentation over new and existing 3D processed information from the first sensor or information from the second sensor to update the 3D navigational map.

In some embodiments, a method for determining semantic segmentation information of a common multi-dimensional space may comprise combining semantic segmentation information from a first multi-dimensional space with semantic segmentation information from a second multi-dimensional space to enhance the semantic segmentation information of the common multi-dimensional space by semantically segmenting at least one first multi-dimensional space point from a first multi-dimensional space to determine at least one first semantic label and at least one first semantic label uncertainty for the at least one first multi-dimensional space point; semantically segmenting at least one second multi-dimensional space point from a second multi-dimensional space with a different multi-dimension than the first multi-dimensional space to determine at least one second semantic label and at least one second semantic label uncertainty for the at least one second multi-dimensional space point; and determining if the at least one first multi-dimensional space point and the at least one second multi-dimensional space point represent a common multi-dimensional space point in the common multi-dimensional space and, if so, fusing the at least one first semantic label and the at least one first semantic label uncertainty with the at least one second semantic label and the at least one second semantic label uncertainty to create fused multi-dimensional spatial information to enhance a semantic segmentation of the common multi-dimensional space point in the common multi-dimensional space.

In some embodiments, the method may further comprise wherein the first multi-dimensional space is a two-dimensional space, the second multi-dimensional space is a three-dimensional space, and the common multi-dimensional space is a three-dimensional space and/or wherein the at least one first multi-dimensional space point is extracted from a two-dimensional image and the at least one second multi-dimensional space point is extracted from a three-dimensional point cloud.

In some embodiments, a non-transitory computer-readable medium having stored thereon at least one program, the at least one program including instructions which, when executed by a processor, cause the processor to perform a method for providing a real time, three-dimensional (3D) navigational map for platforms may comprise integrating at least two sources of multi-modal and multi-dimensional platform sensor information to produce a more accurate 3D navigational map by receiving both a 3D point cloud from a first sensor on a platform with a first modality and a 2D image from a second sensor on the platform with a second modality different from the first modality; generating at least one first space semantic label and at least one first space semantic label uncertainty associated with at least one first space point in the 3D point cloud; generating at least one second space semantic label and at least one second space semantic label uncertainty associated with at least one second space point in the 2D image; and determining if the at least one first space point and the at least one second space point represent a common point in a space surrounding the platform and, if so, fusing the at least one first space semantic label and the at least one first space semantic label uncertainty with the at least one second space semantic label and the at least one second space semantic label uncertainty to create fused 3D spatial information to enhance the 3D navigational map.

In some embodiments, the non-transitory computer-readable medium may further include instructions for the method comprising incorporating temporal or motion related information from the first sensor or the second sensor into the fused 3D spatial information; performing a subsequent fusion of geo-referenced data, distance information, or velocity information with the fused 3D spatial information; periodically performing a joint inference on new and existing information from the first sensor and the second sensor to update the 3D navigational map; determining depth information from information from the first sensor or from information from the second sensor; fusing information from the first sensor and information from the second sensor using a joint deep-learning based 3D semantic segmentation process; and/or using information from the first sensor and information from the second sensor to reason a complete and dense 3D scene by depth propagation or occlusion fill-in processes to enhance the 3D navigational map.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
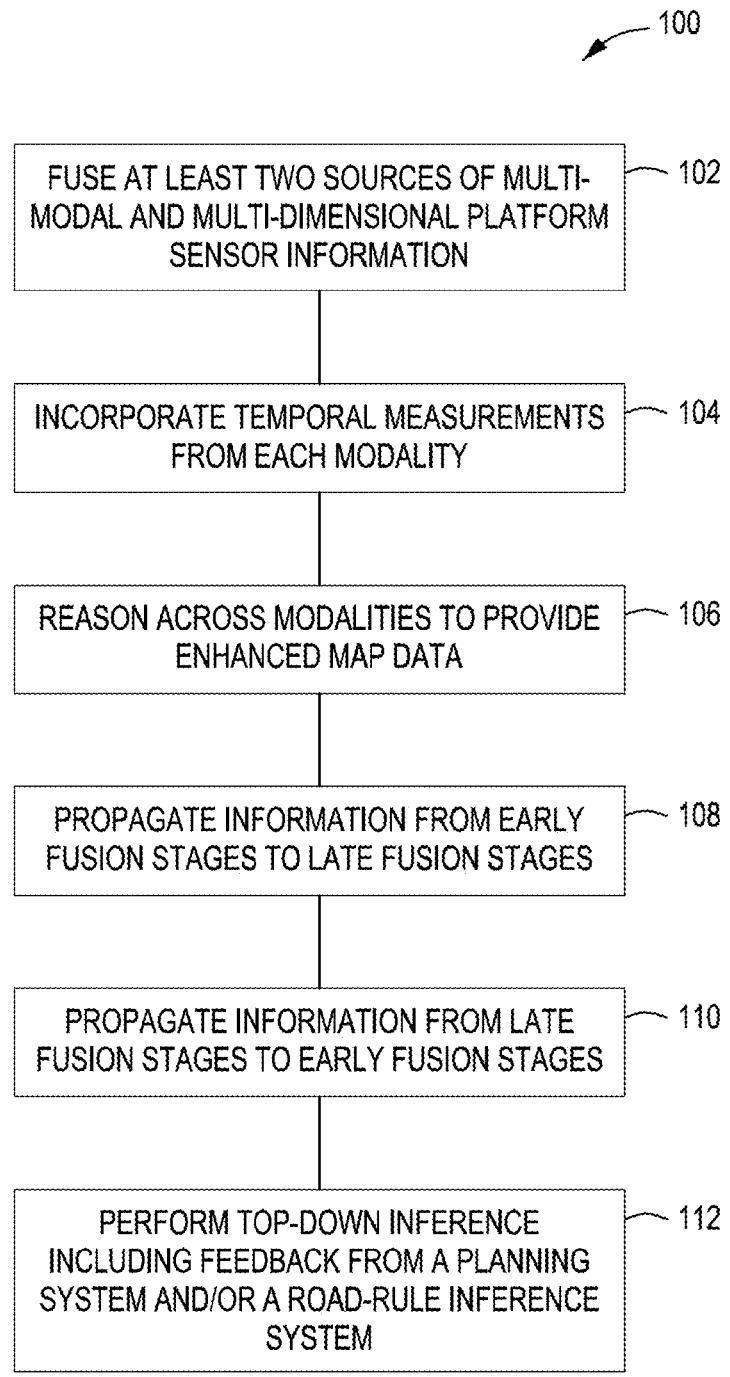
FIG. 1 depicts a method for enhancing 3D navigation information in accordance with some embodiments of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatus and systems for creating dense, three-dimensional navigational maps for platforms. The techniques of the present principles process and fuse complementary multi-dimensional information from different sensor modalities to enhance three-dimensional (3D) map data that is not possible with any single modality. The techniques provide a fully semantic 3D understanding of a perceived environment and a periodically updated 3D model of the real world. In addition, the techniques may be used for path planning using depth estimation for dynamic objects for autonomous vehicles and robots. The techniques may also be incorporated in augmented reality systems on dismounts, ground vehicles, unmanned aerial vehicles (UAVs), waterborne platforms, submerged platforms, and the like.

While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to the use of certain types of sensors, such teachings should not be considered limiting. For example, some embodiments in accordance with the present principles may utilize sensors that provide audio information in addition to the types of sensor information described herein.

Currently available sensors are unable to provide a three-dimensional dense map for navigation. Sensors using technology such as LIDAR (light detection and ranging) provide accurate information up to 200 meters, but the information provided at longer distances is very sparse. Sensors that provide images, such as cameras, are limited to only providing dense information up to 20 meters. Sensors that incorporate technology such as radar may have good range on larger, hard objects such as other vehicles, but the sensors have very limited discrimination of smaller or softer targets such as traffic signs and pedestrians. The methods and apparatus of the present principles overcome the deficiencies of the individual sensor types by fusing multi-dimensional and multi-modal sensor information to produce a more accurate 3D navigational map for platforms. The approach of the present principles is to integrate and to reason information from multiple sensor modalities providing multi-dimensional data and build a 3D fusion map in the geo-referenced world based on that information. It provides real-time generation of a high-fidelity dynamic 3D map surrounding a moving or non-moving platform that includes semantic labels, positions and velocities, and other attributes for objects, including their associated uncertainties.

The techniques of the present principles leverage sensor fusion and deep learning to enhance 3D map data. Multi-dimensional sensor data from multiple modalities is fused and temporal measurements are incorporated from each sensing modality to improve the estimation of attributes, such as semantic labels, in the mapping process. The sensor data may originate from sensors onboard the platform and/or remote from the platform. For example, in some embodiments, the platform may integrate sensor information from other platforms and/or stationary or air-borne sensors and the like. The techniques reason across modalities among different fusion stages to enhance the map data that is not possible with any single modality. The techniques automatically provide a high-quality (high definition or HD), dense, dynamic, and geo-referenced 3D map, by fusing and inferencing information from multiple sensors providing multi-dimensional data, periodically, on a moving or non-moving platform. The 3D map provides an accurate geometric structure and semantic information to understand the 3D dynamic world (including static backgrounds and/or dynamic entities, and the like, such as humans) precisely, in real time. This enhanced 3D map enables safe and accurate planning and control for platforms, such as maneuvering correctly to avoid a curb that is within a few centimeters. The 3D map also provides 3D dense scene information beyond the sensing horizon, allowing platforms, such as autonomous vehicles, to respond in time during high-speed driving and in degrading visual environments.

Figure 9:
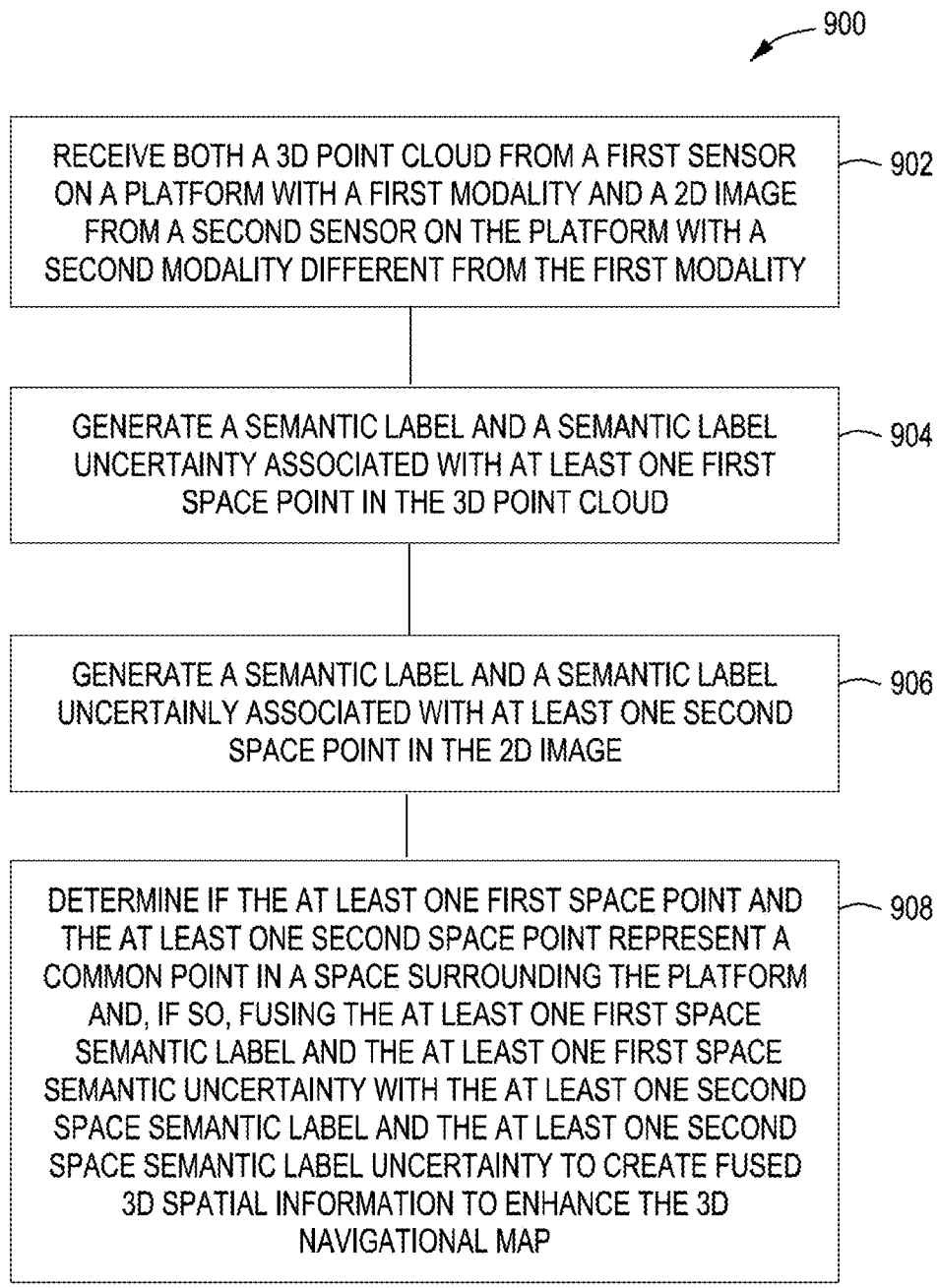
FIG. 9 depicts a method for fusing navigation information in accordance with some embodiments of the present principles.

In FIG. 1, a method 100 for enhancing 3D navigation information according to some embodiments is shown. In block 102, a 3D navigational map is constructed by fusing at least two sources of multi-modal and multi-dimensional platform sensor information. In some embodiments, a method 900, illustrated in FIG. 9, for integrating or fusing at least two sources of multi-modal and multi-dimensional platform sensor information to produce a more accurate 3D navigational map is accomplished by the following. In block 902, both a 3D point cloud from a first sensor on a platform with a first modality and a 2D image from a second sensor on the platform with a second modality different from the first modality is received. In block 904, a semantic label and a semantic label uncertainty associated with at least one first space point in the 3D point cloud is generated. In block 906, a semantic label and a semantic label uncertainly associated with at least one second space point in the 2D image is generated. In block 908, it is determined if the at least one first space point and the at least one second space point represent a common point in a space surrounding the platform. If so, the at least one first space semantic label and the at least one first space semantic uncertainty is fused with the at least one second space semantic label and the at least one second space semantic label uncertainty to create fused 3D spatial information to enhance the 3D navigational map.

The 3D map is enhanced by fusing multi-dimensional data from multiple modalities including, but not limited to, cameras, LIDAR, radar, and/or geo-referenced data and the like. The fused data may include semantic labels and uncertainties associated with the semantic labels. For example, a first source of data may come from a 3D source such as LIDAR and a second source of data may from a 2D source such as a camera that is inferred from 2D space to a 3D space. The first source data and the second source of data may be combined together to improve, for example, semantic segmentation results in a 3D space. The processes may be performed in real time to enable periodic or continuous updates to moving or non-moving platforms. One method of combining the multi-dimensional data from the multi-modal sensors is to divide a common multi-dimensional space into many small cells. Each of the cells may have some segmentation results from different sources such as LIDAR directly and some segmentation results from 2D to 3D image data sources but with varying confidences or uncertainties. In this example, a probability function may be used to find a resulting semantic label based on the combined confidences of the sources. Deep learning may also be utilized to combine the confidences to determine a resulting semantic label for a given multi-dimensional cell.

The fusion will be accomplished by using deep learning methods that leverage different modalities and are trained end-to-end jointly such that each modality is exploited optimally given the affordance of the data. One architecture employs individual deep neural networks for each modality and map the input into a feature representation that will be trained to predict the semantic label of the 3D map. The features for each modality are aggregated by another neural network that has the role of combining the outputs of the networks for each modality to produce the final decision. The individual networks as well as the aggregation network are trained end-to-end jointly. This means that each modality is optimally combined by the neural networks depending on how well they contribute to the final semantic label outcome. This is accounted for by the cost reflecting the mis-classification. The loss is back-propagated to the individual modalities. This ensures that the weights of the modality-specific deep learning networks, as well as the weights of the deep network that is fusing all the modalities, are optimally selected based on how well each modality contributes to the final decision in terms of semantic classification.

The fusion deep-learning network framework combines scores (or probabilities) from individual modalities and combines them into a single decision with an associated confidence using the early-fusion deep learning framework described earlier. The confidence in the outcome semantic classification is directly related to the relative importance of the input measurements that is learned during training of the deep neural network architecture for fusion.

In block 104 temporal measurements from the multi-dimensional data sensors of each modality is incorporated into the 3D map data. The 3D map may also incorporate temporal measurements from each sensing modality to improve the map attributes. In block 106, the method 100 reasons across the different multi-dimensions and modalities to provide enhanced 3D map data that is not possible with any single modality or single dimension. The reasoning may be implemented at multiple levels of understanding during the inference process across different inference stages (e.g., early fusion, late fusion, etc.). In block 108, information from early fusion stages may be propagated into late fusion stages. In block 110, information from late fusion stages may be propagated into early fusion stages. The information from early and/or late stages may be propagated to early and/or late stage fusion for better 3D map reasoning. In block 112, top-down inference including feedback from a planning system and/or a road-rule inference system is performed to further enhance the 3D map data. The output of the method 100 is real-time generation of a high-fidelity dynamic 3D map surrounding a moving platform that includes semantic labels, positions and velocities, and potentially other attributes for objects, including associated uncertainties. For example, in some embodiments, the attributes may include velocity and direction of objects such as, for example, vehicles and/or pedestrians and the like. Like the semantic labels, the objects and attributes will also have uncertainties associated with them. Additionally, the method allows for path planning using depth estimation for dynamic objects for autonomous vehicles and/or robots.

Figure 2:
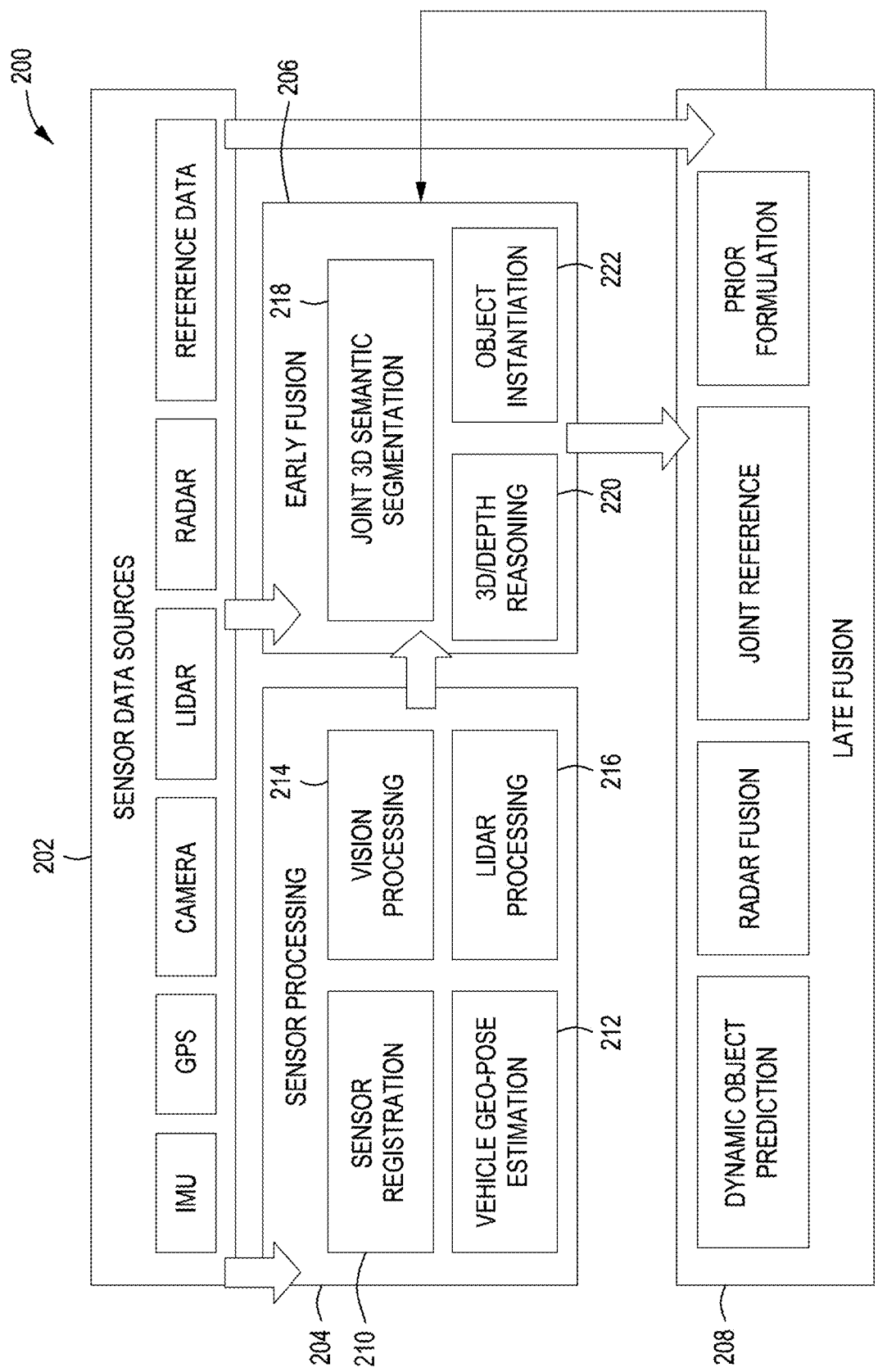
FIG. 2 depicts a representative architectural framework in accordance with some embodiments of the present principles.

FIG. 2 illustrates a representative architectural framework 200 that may be utilized in some embodiments. The techniques integrate and reason about information from multiple sensor and data sources 202 from more than one modality to build a 3D fusion map in a geo-referenced world. The map uses a volumetric representation that depicts both metric structure and semantic labels. The map is in the form of a set of 3D cubic voxels with per-voxel semantic labels and uncertainties. The 3D cubic voxel's semantic label and/or uncertainty is updated based on actual information and/or predicted information in real time. The semantic segmentation and/or uncertainty may be enhanced with secondary data when available. The secondary data may be auxiliary data that is not part of a primary data set of a sensor such as an image of a camera. The secondary data may include, but is not limited to, velocity information, and the like. The semantic labels may originate from categories such as, but not limited to, car, pedestrian, road, building, tree, etc. The map may be constructed by fusing multiple sensors or data sources from, but not limited to, cameras, LIDAR, radar, and prior geo-referenced data and the like. In some embodiments, multiple low resolution sensors of a similar type may be used and their input information combined to enhance their resolution. This allows less expensive sensors to be used while maintaining a high level of resolution.

In a sensor processing stage 204, new sensing information is processed to derive useful information such as, but not limited to, 2D semantic labeling and stereo depth computation from cameras, and/or aligning continuous LIDAR scans to get 3D point clouds and the like. In the early fusion stage 206, information from the sensors is fused to perform joint deep-learning based 3D semantic segmentation and to reason complete and dense 3D scene (e.g., occlusion fill-in, depth propagation, etc.). For example, in occlusion fill-in, semantic labels of nearby spaces may be used to determine what the occluded spaces are (e.g., car, pedestrian, sky, ground, road, etc.). In the late fusion stage 208, joint inference is continuously performed over new and existing measurements from the sensors and/or sources jointly to update the 3D map. The late fusion stage 208 allows for higher confidences of objects in the 3D map data through the use of multiple sensor/source data. Geo-positioning sources may also be incorporated in the late fusion stage 208 to determine movement and orientation of the mobile platform at a given time. During the early fusion stage 206 and/or the late fusion stage 208, priority may be given to processing of certain sensor data or to processing of certain combinations of sensor data dependent on the velocity of the mobile platform and/or the orientation of the mobile platform. For example, at high velocities, radar sensor information at long distance may be given a higher priority for processing, if necessary, than at low velocities.

In the sensor processing stage of FIG. 2, the sensor registration 210 may include processes for determining which sensors are in communication and their location and/or orientation. Additional performance information such as a sensor's field of view, modality, update rate, range, resolution, and/or other relevant information may also be obtained during the sensor registration 210. Sensors may also be aligned and/or determined coverage areas may be established to aid in synchronizing the sensors. Sensors may include, but are not limited to, vision or image based sensors such as cameras and/or LIDAR and the like. The sensors may also include signal-based sensors such as, but not limited to, radio detection and ranging (radar) and other non-vision based sensors. The sensors may also include sound wave based detection devices such as, but not limited to, sound navigation and ranging (sonar) and/or other audio reception devices (e.g., microphones) and the like. Audio based sensors allow sounds to be incorporated into the data fusion process as primary data (e.g., direct detection by sonar of an object, etc.) and/or as auxiliary data to increase the confidence of uncertainties from other sensors (e.g., train whistle aids in confirming that an object that was detected by a vision based sensor is in fact a train, etc.). The audio based sensors may also be used as a primary data source (e.g., train whistle when no other sensor has detected a train). The audio based sensor may also provide a vector to a source of a sound. This may aid in control inputs (e.g., increase velocity, stop, veer left, veer right, etc.) discussed below (e.g., train whistle originating from left of the mobile platform, etc.).

While sensor data may provide information regarding the environment of the mobile platform, the orientation of the mobile platform within the environment may also be established for navigational purposes. In some embodiments, in the sensor processing stage 204 of FIG. 2, the vehicle geo-pose estimation 212 may also use global positioning system (GPS) data and/or inertial measurement unit (IMU) data that help to localize the mobile platform and its dynamic map in the geo-referenced world in real time. This also helps when sharing the enhanced 3D map with other vehicles. In some embodiments, any available sensor data (e.g., camera, etc.) may be utilized for computing the 3D position and 3D orientation of the mobile platform in the geo-referenced world in real time. The estimated mobile platform motion may be used to align 3D motion stereo, LIDAR information, and/or other sensors continuously. In some embodiments, the estimated motion of the platform may be used to compare to the velocity information from, for example, full motion video (FMV) LIDAR velocity information on 3D points, so that moving objects that have different motion than the host platform may be segmented out. Information from any sensor and data source can be used to update the affected voxels in the 3D geo-referenced dynamic map, based on the relationship between the sensor (on the mobile platform) and the geo-referenced pose (position and orientation) of the moving mobile platform.

Figure 3:
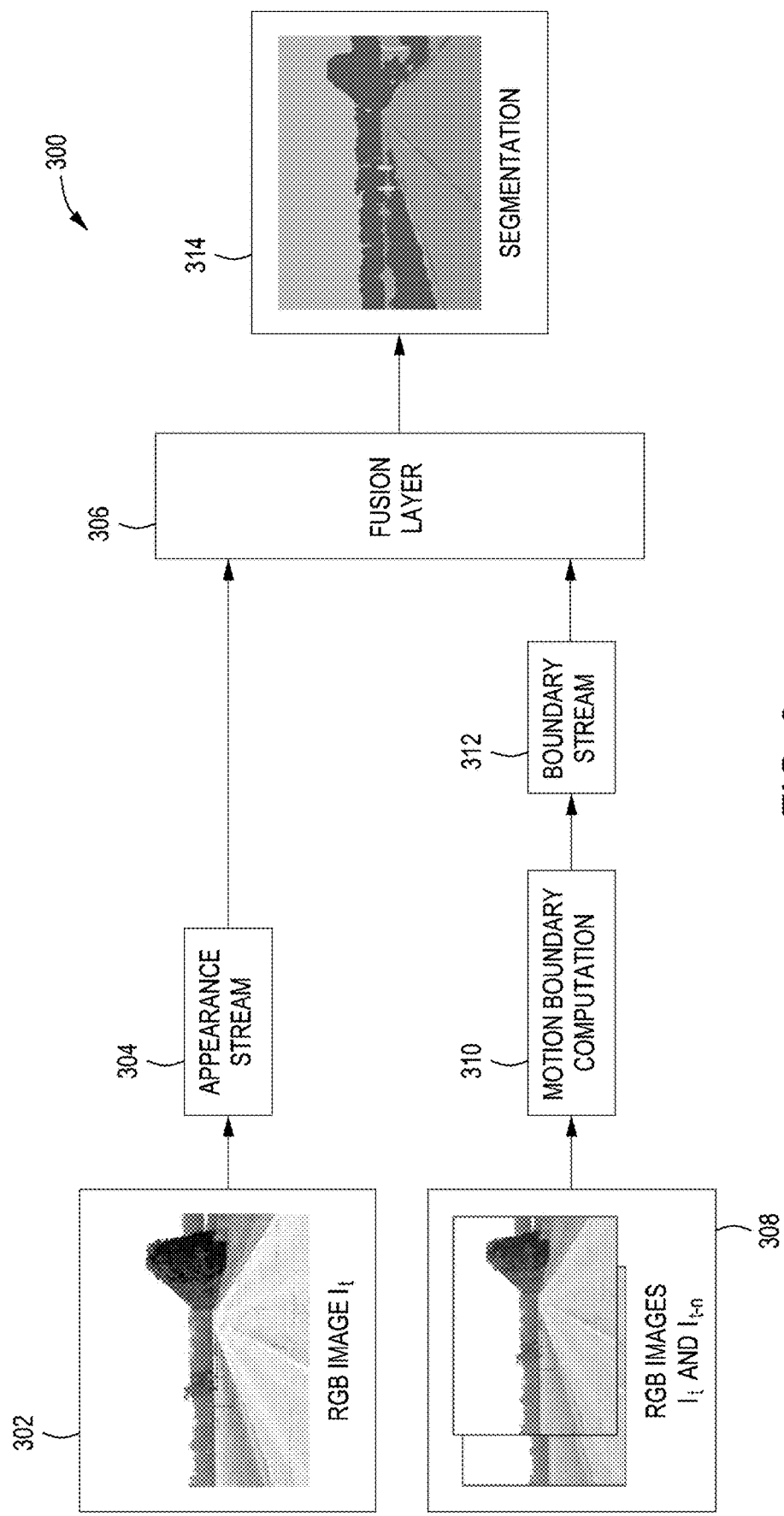
FIG. 3 depicts an image process in accordance with some embodiments of the present principles.

In the sensor processing stage 204 of FIG. 2, the vision processing 214 may include a deep spatial-temporal image semantic segmentation network that labels each imaged pixel into one of the semantic classes in real time. 3D reconstruction may be performed on stereo depth and motion stereo methods. In FIG. 3, an image process 300 is shown. The image process 300 may receive a static image 302 and process it through an appearance stream 304 into a fusion layer 306. The image process 300 may also receive set of motion images 308 which are processed by a motion boundary computation 310 and then by a boundary stream 312 and then into the fusion layer 306. The fusion layer 306 fuses the image information and provides a segmentation 314 of the image information. The estimated 3D information, including static and dynamic entities, with semantic labels is complementary to sparse LIDAR information.

Figure 4:
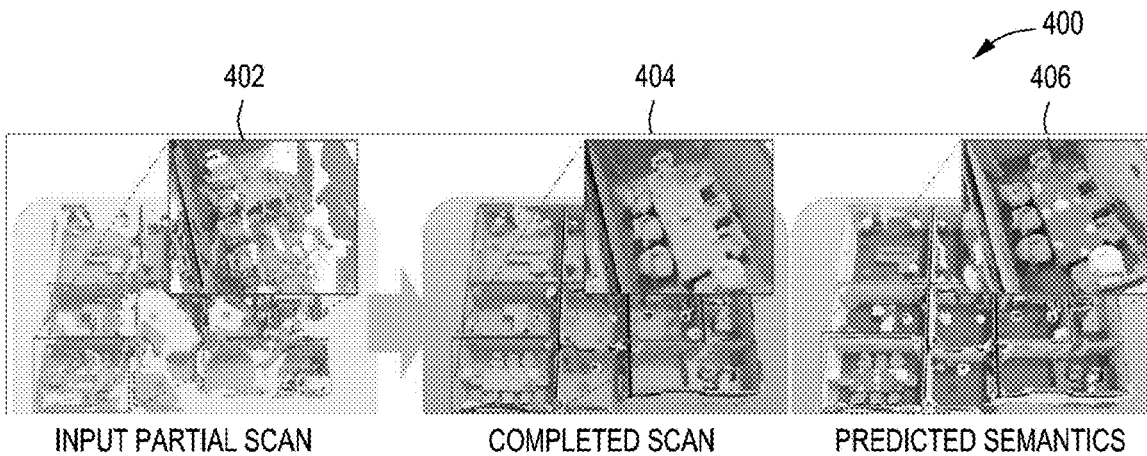
FIG. 4 depicts an image process used with LIDAR in accordance with some embodiments of the present principles.

In the sensor processing stage 204 of FIG. 2, the LIDAR processing 216 may, in some embodiments, include three processes that are used to enhance the 3D map. In a first process, a 3D map is created using rolling oct-trees to accumulate 3D point clouds and provide the representational framework for continuously processing 3D point clouds within approximately 200 m of a mobile platform. This ensures point cloud compression and updates of the 3D map for moving objects. In a second process, 3D point cloud segmentation and 3D object detection is performed using use deep-learning architectures such as, for example, Point-Net, SuperPointGraph Network, and SEGCloud Network. The 3D points are classified into classes, such as, for example, ground (e.g., pavement, grass, etc.), vehicles, traffic signs, buildings, vegetation, pedestrians, etc. The second process operates directly on point-clouds and is independent of the voxelization. The second process works by using a coarse voxel structure: (1) encode the shape around each voxel within a radius to a feature encoding using a deep network; (2) take the feature encodings around a larger radius and apply a convolutional network; (3) train end-to-end (1) and (2) layers jointly. If FMV LIDAR is available, the region proposals may be aided to identify moving objects more reliably. In a third process, 3D is completed and a super-resolution is obtained. FIG. 4 illustrates the third process 400. The LIDAR sensor provides an input partial scan 402 that is then completed 404 and then semantics are predicted 406. Deep neural networks employ 3D convolutions on the 3D grid containing truncated signed distance (TSD) values, to produce completed 3D models in the same resolution and format as the input and are naturally multi-resolution. Hole filling can aid in rendering of the RGB information from videos on the global map. For example, a program such as ScanComplete (see, Dai, A., Ritchie, D., Bokeloh, M., Reed, S., Sturm, J., Nießner, M.: ScanComplete: Large-scale scene completion and semantic segmentation for 3d scans. arXivpreprint arXiv:1712.10215 (2018)), may be used which produces a complete scan and labels at the same time (the program is static and doesn't take additional time for processing).

In the early fusion stage 206 of FIG. 2, the goal is to perform joint 3D semantic segmentation 218 in 3D space by fusing complementary information from sensors such as, for example, a camera and a LIDAR sensor. In this stage, as much information as is possible is extracted from each individual sensor. In some embodiments, the complementary information may include, but is not limited to, 3D points (e.g., stereo matches and motion stereo) from vision associated with image-based semantic labels and uncertainties, 3D LIDAR point cloud points associated with semantic labels and uncertainties, and/or FMV LIDAR 3D velocity information. The estimated vehicle motion is used to align and to accumulate the 3D processed information across time. Joint 3D semantic segmentation 218 is performed by fusing 3D processed information with semantic labels and uncertainties over affected 3D voxels. This may be achieved by using a deep learning network for 3D semantic segmentation, such as, for example, a two-stream architecture (e.g., vision and LIDAR). It may also be achieved by formulating a probability model and computing posterior probabilities over possible semantic labels for each 3D voxel based on all observations (3D processed information). The 3D segmented information may also be fed back to help 2D image-based semantic segmentation (e.g., visual processing).

Figure 5:
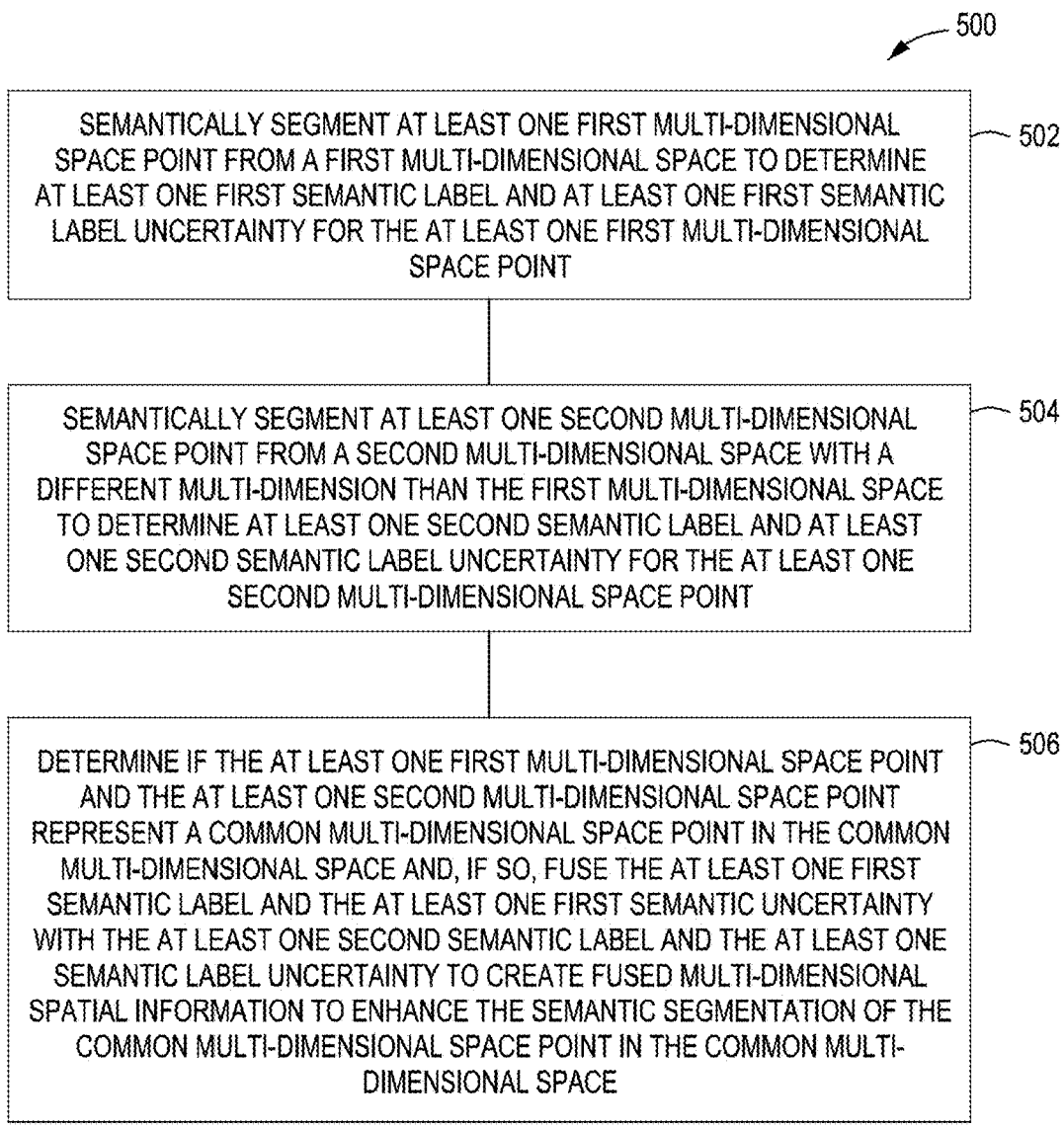
FIG. 5 depicts a method for determining semantic segmentation information of a common multi-dimensional space in accordance with some embodiments of the present principles.

In FIG. 5, a method 500 for determining semantic segmentation information of a common multi-dimensional space according to some embodiments is illustrated. The method 500 combines semantic segmentation information from a first multi-dimensional space with semantic segmentation information from a second multi-dimensional space to enhance the semantic segmentation information of the common multi-dimensional space. In block 502, at least one first multi-dimensional space point from a first multi-dimensional space is semantically segmented to determine at least one first semantic label and at least one first semantic label uncertainty for the at least one first multi-dimensional space point. In block 504, at least one second multi-dimensional space point from a second multi-dimensional space with a different multi-dimension than the first multi-dimensional space is semantically segmented to determine at least one second semantic label and at least one second semantic label uncertainty for the at least one second multi-dimensional space point.

In block 506, if it is determined that the at least one first multi-dimensional space point and the at least one second multi-dimensional space point represent a common multi-dimensional space point in the common multi-dimensional space, the at least one first semantic label and the at least one first semantic uncertainty is fused with the at least one second semantic label and the at least one semantic label uncertainty to create fused multi-dimensional spatial information to enhance the semantic segmentation of the common multi-dimensional space point in the common multi-dimensional space. In some embodiments, the first multi-dimensional space is a two-dimensional space, the second multi-dimensional space is a three-dimensional space, and the common multi-dimensional space is a three-dimensional space. In some embodiments, the at least one first multi-dimensional space point is extracted from a two-dimensional image and the at least one second multi-dimensional space point is extracted from a three-dimensional point cloud.

In the early fusion stage 206 of FIG. 2, the joint 3D semantic segmentation 218 is continuously performed over new and existing 3D processed information from, for example, cameras and LIDAR across time to update the affected voxels in a 3D dynamic map. Each 3D voxel in semantic segmentation space is represented with possible semantic labels with uncertainties. New 3D processed information provides new observations/evidences to update these semantic labels with uncertainties in affected 3D voxels. Secondary data may be incorporated into the semantic segmentation process. The secondary data may include data other than the primary data (the image itself). The secondary data may include velocity and other information associated with the primary data. In some embodiments, FMV LIDAR velocity information may be incorporated. Moving objects may also be segmented out by comparing vehicle motion against the FMV LIDAR velocity information. The predicted semantic segmentation from a previous time instance, based on FMV LIDAR velocity information for affected voxels and vehicle motion, may be used as a prior for semantic segmentation at a current time instance. The predicted semantic segmentation may be used to help to train the deep network for semantic segmentation (compared to actual segmentation). In addition, a 3D map from LIDAR (with hypothesized hole fillings) helps in enabling mapping any pixel from cameras to the 3D map (ray-tracing).

Figure 6:
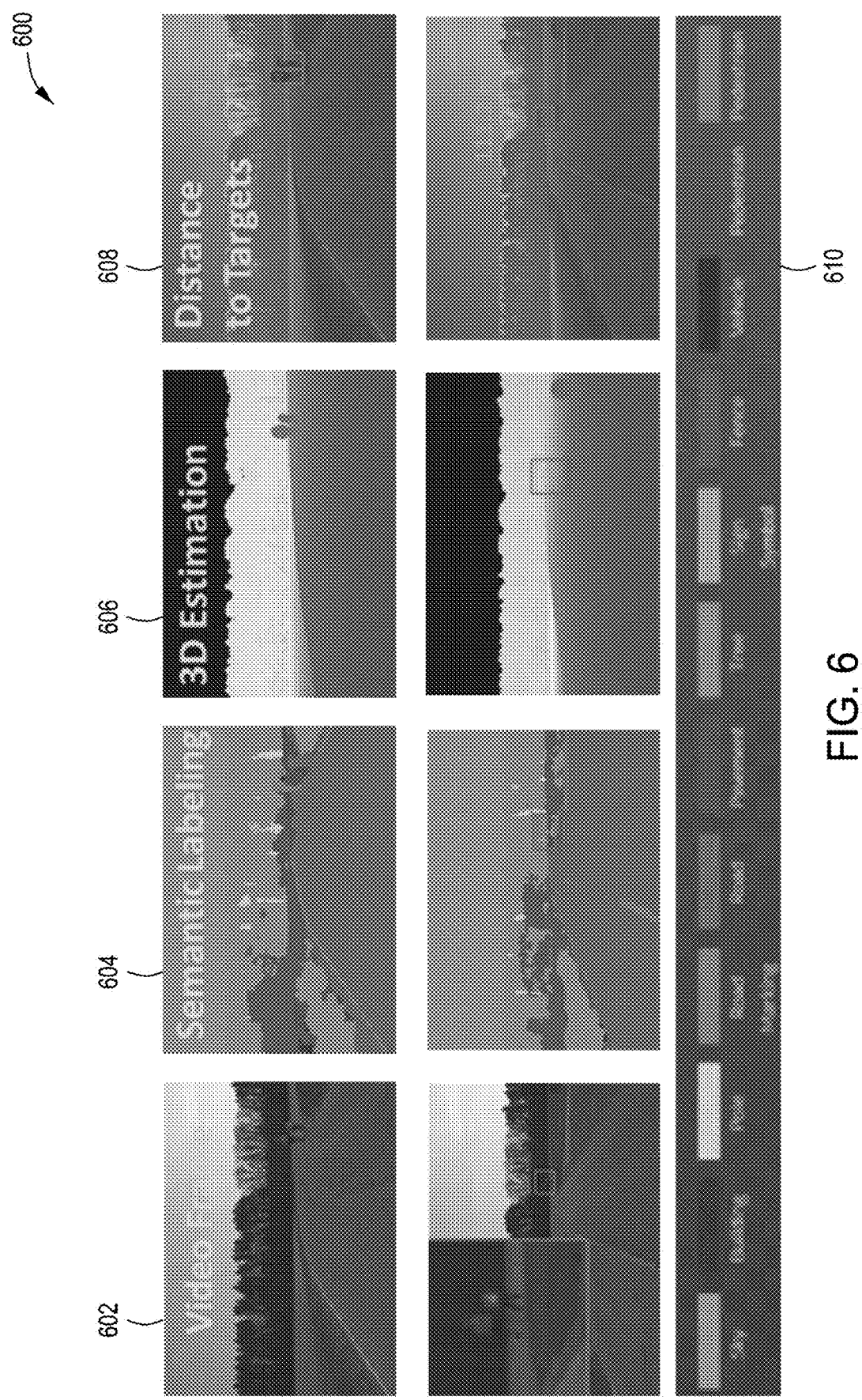
FIG. 6 depicts an example of image processing in accordance with some embodiments of the present principles.

In the early fusion stage 206 of FIG. 2, processes such as 3D depth reasoning 220 and object instantiation 222 may also be used to estimate complete and dense 3D scene structure with projected depths up to 200 meters based on semantic segmentations, propagate, for example, LIDAR points and 3D stereo vision points in segmented voxels to infer dense depth based on semantic labels (such as roads), and construct and verify 3D object models based on segmentation corresponding to that part of the scene. FIG. 6 is an example 600 of the image processing according to some embodiments. An object determination process 600 is used on a video frame 602 to locate two pedestrians in this example 600. A semantic labeling process 604 provides labels for the video frame. The labels 610 may include sky, building, pole, road, pavement, tree, sign, fence, vehicle, pedestrian, etc. A 3D estimation process 606 analyzes the image to determine a 3D space or point cloud. In some embodiments, the 3D estimation process 606 may include obtaining a two-dimensional image, determining a depth map from the 2D image, converting the depth map to a Euclidean video point cloud, and registering the video point cloud directly onto a 3D point cloud as disclosed in commonly owned U.S. Pat. No. 7,187,809, entitled Method and Apparatus for Aligning Video to Three-Dimensional Point Clouds. A distance estimation process 608 then determines a distance to the objects (pedestrians).

In the late fusion stage 208 of FIG. 2, the framework may continuously retrieve geo-referenced data based on a current geo-referenced position of a moving mobile platform and then process and use the retrieved geo-referenced data as a prior in the affected voxels in the 3D map. Prior geo-referenced data may be, but is not limited to, overhead reference imagery, terrain maps, such as digital terrain elevation data (DTED), and aerial LIDAR. The distance information to detected objects, such as, for example, a car, may be obtained from, for example, radar and may be formulated with estimated uncertainty and then used to update the 3D map. The velocity information from FMV LIDAR also helps the prediction of the dynamic objects, and can be used to maintain the consistency of the affected voxels across time and space in the 3D dynamic map. In some embodiments, constraints may be added, such as, for example, group coherence for nearby voxels, as measurements to improve consistency of the 3D dynamic map over space and time.

Figure 7:
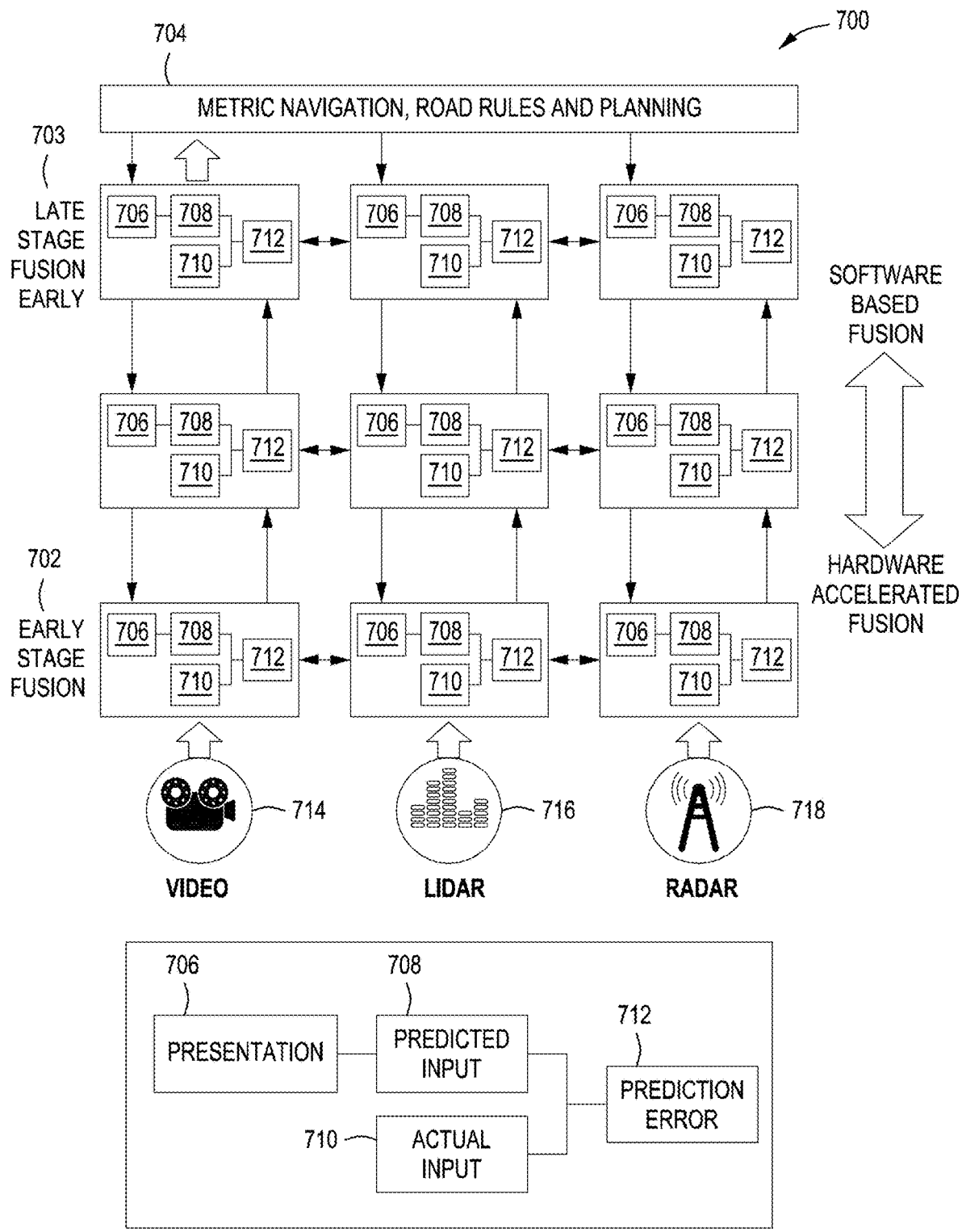
FIG. 7 depicts an alternative multi-modal data fusion architecture in accordance with some embodiments of the present principles.

FIG. 7 illustrates an alternative multi-modal data fusion architecture 700 that may be used according to some embodiments. The architecture 700 may or may not use deep-learning. The architecture is a predictive coding based inference framework for multi-modal data fusion. The early stage fusion 702 is improved temporally. Each modality within a layer may provide information to other modalities of the same layer to enable fusion. Bottom up data feeds higher level decision making as the fusion data moves up. The top-down flow of high-level understanding feeds the low-level inferences. At the highest level 704, navigation information, road-rules, planning, and human interactions may feed controls to the fusion engine. Although FIG. 7 shows three different fusion stages, the architecture 700 may utilize more or less than three fusion stages. The architecture 700 has high accuracy and the model continuously builds to adapt and increase its prediction accuracy. A presentation 706 is used as a predicted input 708 which is compared against an actual input 710 to determine a prediction error 712. The prediction error 712 is then used to refine each stage 702-704 of a model based on the alternative multi-modal data fusion architecture 700 over time. Prediction error feedback may be used at every stage and/or across different sensors and/or sources 714-718.

In some embodiments, the multi-modal sensor data and/or fused 3D map may be shared across multiple mobile platforms for collaborative navigation and mapping. Information of the same 3D voxel from different perspectives from multiple mobile platforms reduces the uncertainty of the estimation of the voxel in the shared map. The sharing across platforms for collaborative mapping will depend on positions/configurations/properties/fidelities/communications of moving mobile platforms. The sharing does not need to be across all platforms. For example, it is not necessary to share information from a mobile platform at the end of a fleet to the mobile platform to the front of the fleet. In some embodiments, the sharing of information may be selectable and/or may be automatically engaged based on proximity, position within a group, and/or uncertainty level of provided information and the like.

In some embodiments, the 3D dynamic map may be used to actively control a platform that is capable of being mobile. Control and planning for autonomous platforms may be based on the overall confidence and/or density of the 3D map for safer and more efficient navigation. For example, if the confidence of a safe space in the nearby voxels in the 3D map is not high, the mobile platform may be told to go slow down to avoid accidents and to get more observations to update the map. In some embodiments, the 3D map may also provide information to control auxiliary components, such as, for example, the headlights (e.g., adaptive headlights) based on a current uncertainty of the map, such as automatically enhancing the lighting to reduce a perception uncertainty in dark environments.

In some embodiments, the distribution of the processing for computing the dynamic 3D map may be controlled. For example, the distribution and the level of processing of the voxels in the dynamic 3D map may be decided according to events/control commands from the mobile platform for more efficient mapping to support real-time autonomous applications. In another example, data acquisition for particular voxels inside an HD 3D map may be focused/processed based on current direction of the mobile platform—such as voxels on the frontal side of the mobile platform when the mobile platform moves forward. In another example, if the current speed becomes slower, information may be processed within a limited range but for broader regions (angles) around the mobile platform.

Figure 8:
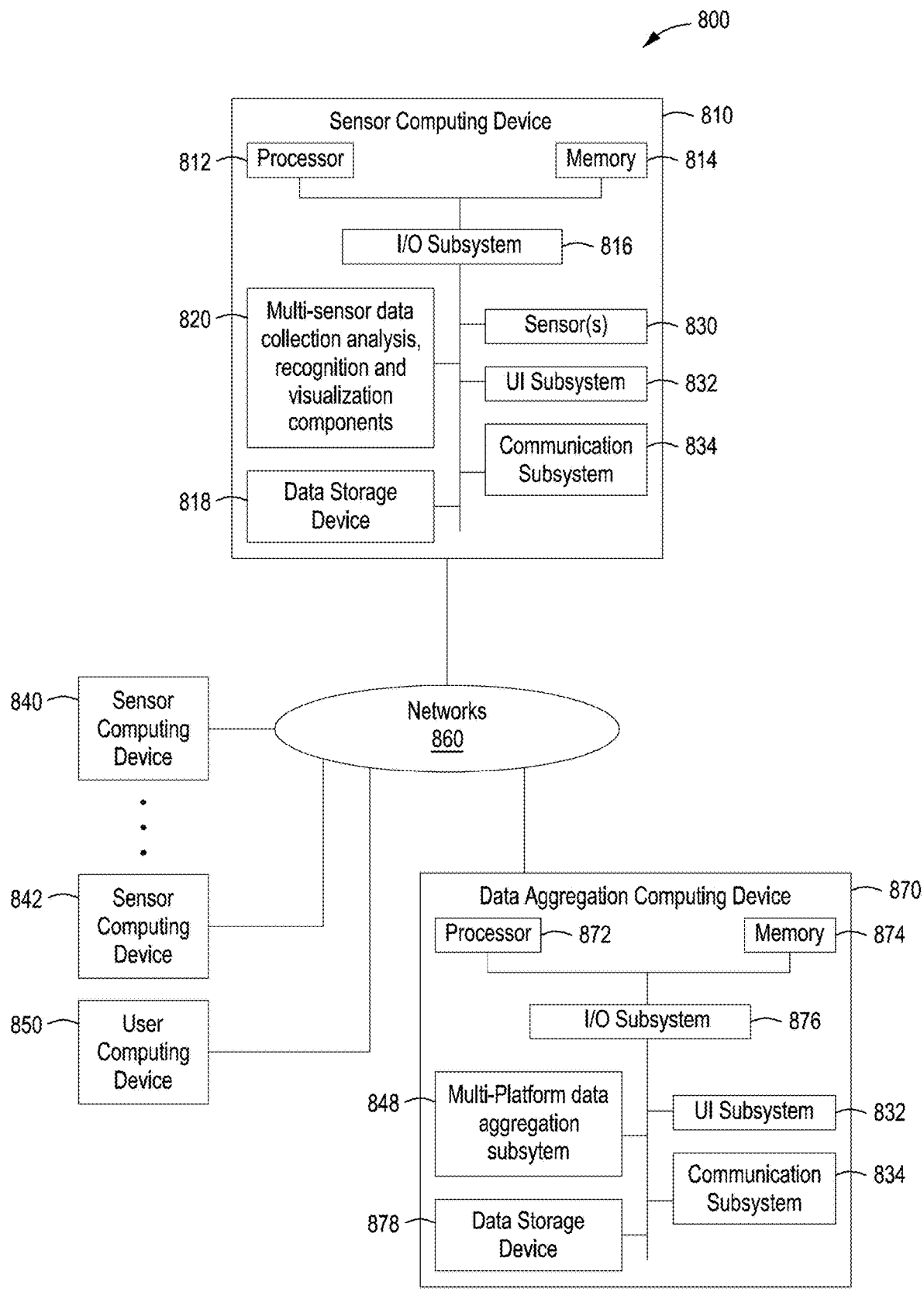
FIG. 8 depicts a high-level block diagram of a system in accordance with some embodiments of the present principles.

FIG. 8 is a block diagram of system 800 according to some embodiments. While the illustrative embodiment is shown as involving multiple components and devices, it should be understood that the system 800 may constitute a single computing device, alone or in combination with other computing devices. The embodiment includes a sensor computing device 810, which embodies features and functionality for multi-sensor data collection, analysis, recognition, and visualization components 820 of the system 800, a data aggregation computing device 870, which embodies features and functionality of a multi-platform data aggregation subsystem 848 for collaborative efforts, and a user computing device 850, which embodies features and functionality for other sources of data such as crowd sourcing and the like. The system 800 may include multiple additional sensor computing devices 840, 842, each of which may be embodied in a similar manner as the sensor computing device 810. Each or any of the computing devices 810, 840, 842, 850, 870 may be in communication with one another via one or more networks or other types of communication links, 860 such as Bluetooth, Wi-Fi, etc. from other mobile platforms, satellites, and/or stationary systems and the like.

The system 800 or portions thereof may be distributed across multiple computing devices that are connected to the network(s) 860 as shown. In other embodiments, the system 800 may be located entirely on, for example, the sensor computing device 810 or one of the devices 850, 870. In some embodiments, portions of the system 800 may be incorporated into other systems or computer applications (e.g. as a plugin). Such applications or systems may include, for example, operating system software or geographic information system (GIS) applications. As used herein, "application" or "computer application" may refer to, among other things, any type of computer program or group of computer programs, whether implemented in software, hardware, or a combination thereof, and includes self-contained, vertical, and/or shrink-wrapped software applications, distributed and cloud-based applications, and/or others. Portions of a computer application may be embodied as firmware, as one or more components of an operating system, a runtime library, an application programming interface (API), as a self-contained software application, or as a component of another software application, for example.

The sensor computing device 810 includes at least one processor 812 (e.g. a microprocessor, microcontroller, digital signal processor, etc.), memory 814, and an input/output (I/O) subsystem 816. The sensor computing device 810 may be embodied as any type of computing device capable of performing the functions described herein, such as a mobile robot, a navigation-capable electronic device, an unmanned or unpiloted aerial or ground vehicle, a water-borne vehicle, a submerged vehicle, a personal computer (e.g., desktop, laptop, tablet, smart phone, body-mounted device, wearable device, etc.), a smart appliance, a server, an enterprise computer system, a network of computers, a combination of computers and other electronic devices, or other electronic devices. Although not specifically shown, it should be understood that the I/O subsystem 816 typically includes, among other things, an I/O controller, a memory controller, and one or more I/O ports. The processor 812 and the I/O subsystem 816 are communicatively coupled to the memory 814. The memory 814 may be embodied as any type of suitable computer memory device (e.g., volatile memory such as various forms of random access memory).

The I/O subsystem 816 is communicatively coupled to a number of hardware and/or software components, including the components of the architectural framework 200 of FIG. 2 and the alternative multi-modal data fusion architecture 700 of FIG. 7, a data storage device 818, a number of sensors 830, a user interface (UI) subsystem 832, and a communication subsystem 834. The sensors 830 may include one or more cameras (e.g., 2D and/or 3D still and/or video cameras), as well as other types of sensors such as IMUs, accelerometers, gyroscopes, GPS receivers, LIDAR systems, FMV LIDAR systems, radar systems, and/or others. As used herein, a "camera" may refer to any type of 2D or 3D image sensor or other device that is capable of acquiring and recording two-dimensional (2D) or three-dimensional (3D) video images of portions of the real-world environment, and may include cameras with one or more fixed camera parameters and/or cameras having one or more variable parameters, fixed-location cameras, and/or mobile cameras (such as cameras that are integrated with consumer electronic devices, such as laptop computers, smart phones, tablet computers, wearable electronic devices and/or others.

The user interface subsystem 832 includes one or more user input devices (e.g., a touchscreen, keyboard, virtual keypad, microphone, etc.) and one or more output devices (e.g., speakers, display devices, LEDs, etc.). The user interface subsystem 832 may include devices such as a touch-screen display, a touch-sensitive keypad, a kinetic sensor and/or other gesture-detecting device, an eye-tracking sensor, and/or other devices that are capable of detecting human interactions with a computing device. The devices 850, 870 may be in communication with the sensor computing device 810 and/or other devices 840, 842 by the network/communication links 860. It should be understood that any or all of the devices 840, 842, 850, 870 may be integrated with the sensor computing device 810 or embodied as a separate component.

The I/O subsystem 816 may be communicatively coupled to multi-sensor data collection, analysis, recognition, and visualization components, one or more data storage devices (e.g., machine readable storage media) 818, a user interface (UI) subsystem 832, and a communication subsystem 834. The data storage device 818 may include one or more hard drives or other suitable data storage devices (e.g., flash memory, memory cards, memory sticks, and/or others). In some embodiments, portions of the system 800, e.g., the mobile platform components, and/or other data and components, reside at least temporarily in the data storage device 818. Portions of the system 800, e.g., portions of the mobile platform components, may be copied to the memory 814 during operation of the computing device 810, for faster processing or other reasons. The communication subsystem 834 communicatively couples the sensor computing device 810 to one or more other devices, systems, or communication networks, e.g., a local area network, wide area network, personal cloud, enterprise cloud, public cloud, and/or the Internet, for example. Accordingly, the communication subsystem 834 may include one or more wired or wireless network interface software, firmware, or hardware, for example, as may be needed pursuant to the specifications and/or design of the particular embodiment of the system 800.

The user computing device 850 and the data aggregation computing device 870 each may be embodied as any suitable type of computing device or personal electronic device capable of performing the functions described herein, such as any of the aforementioned types of devices or other electronic devices. The illustrative user computing device 850 and data aggregation computing device 870 each include components having the same or similar names to components of the sensor computing device 810, described above, and accordingly, those components of the computing devices 850, 870 may be embodied similarly. Further, each of the devices 810, 840, 842, 850, 870 may include components similar to those described above, and the system 800 may include other components, sub-components, and devices not illustrated in FIG. 8. In general, the components of the computing system 800 are communicatively coupled as shown in FIG. 8 by signal paths, which may be embodied as any type of wired or wireless signal paths capable of facilitating communication between the respective devices and components.

In the foregoing description, numerous specific details, examples, and scenarios are set forth in order to provide a more thorough understanding of the present principles. It will be appreciated, however, that embodiments of the principles can be practiced without such specific details. Further, such examples and scenarios are provided for illustration, and are not intended to limit the teachings in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the teachings can be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for case of discussion, and are not intended to imply that any specific implementation details are required. For example, any of the described modules and/or data structures may be combined or divided into sub-modules, sub-processes or other units of computer code or data as may be required by a particular design or implementation of the architectural framework 200, 700. Further, references herein to rules or templates are not meant to imply any specific implementation details. That is, the architectural framework 200, 700 can store rules, templates, etc. in any suitable machine-readable format.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the teachings herein.

While the foregoing is directed to embodiments in accordance with the present principles, other and further embodiments in accordance with the principles described herein may be devised without departing from the basic scope thereof, and the scope thereof is determined by the claims that follow.

The invention claimed is:

1. A method for providing a real time, three-dimensional (3D) navigational map for platforms, the method comprising integrating at least two sources of multi-modal and multi-dimensional platform sensor information to produce a more accurate 3D navigational map by:
receiving both a 3D point cloud from a first sensor on a platform with a first modality and a 2D image from a second sensor on the platform with a second modality different from the first modality;
generating at least one first space semantic label and at least one first space semantic label uncertainty associated with at least one first space point in the 3D point cloud;
generating at least one second space semantic label and at least one second space semantic label uncertainty associated with at least one second space point in the 2D image; and
determining if the at least one first space point and the at least one second space point represent a common point in a space surrounding the platform and, if so, fusing the at least one first space semantic label and the at least one first space semantic label uncertainty with the at least one second space semantic label and the at least one second space semantic label uncertainty to create fused 3D spatial information of the common point in the space surrounding the platform to enhance the 3D navigational map.

2. The method of claim 1, further comprising:
fusing temporal or motion related information from the first sensor or the second sensor into the fused 3D spatial information.

3. The method of claim 1, further comprising:
performing a subsequent fusion of geo-referenced data, distance information, or velocity information with the fused 3D spatial information to further enhance the 3D navigational map.

4. The method of claim 3, further comprising:
periodically performing a joint inference on new and existing information from the first sensor and the second sensor to update the 3D navigational map.

5. The method of claim 1, further comprising:
determining depth information from information from the first sensor or from information from the second sensor.

6. The method of claim 1, further comprising:
fusing 3D information from the first sensor and 2D information from the second sensor using a joint deep-learning based 3D semantic segmentation process.

7. The method of claim 1, further comprising:
using combined information from the first sensor and information from the second sensor to reason a complete and dense 3D scene by depth propagation or occlusion fill-in processes to enhance the 3D navigational map.

8. The method of claim 1, further comprising:
localizing the 3D navigational map using a GPS source or an IMU source.

9. The method of claim 1, further comprising:
using velocity information from a full motion video (FMV) LIDAR sensor to augment a motion estimation of the platform.

10. The method of claim 1, further comprising:
periodically performing semantic segmentation over new and existing 3D processed information from the first sensor or information from the second sensor to update the 3D navigational map.

11. A method for determining semantic segmentation information of a common multi-dimensional space, the method comprising combining semantic segmentation information from a first multi-dimensional space with semantic segmentation information from a second multi-dimensional space to enhance the semantic segmentation information of the common multi-dimensional space by:
semantically segmenting at least one first multi-dimensional space point from a first multi-dimensional space to determine at least one first semantic label and at least one first semantic label uncertainty for the at least one first multi-dimensional space point;
semantically segmenting at least one second multi-dimensional space point from a second multi-dimensional space with a different multi-dimension than the first multi-dimensional space to determine at least one second semantic label and at least one second semantic label uncertainty for the at least one second multi-dimensional space point; and determining if the at least one first multi-dimensional space point and the at least one second multi-dimensional space point represent a common multi-dimensional space point in the common multi-dimensional space and, if so, fusing the at least one first semantic label and the at least one first semantic label uncertainty with the at least one second semantic label and the at least one second semantic label uncertainty to create fused multi-dimensional spatial information to enhance a semantic segmentation of the common multi-dimensional space point in the common multi-dimensional space.

12. The method of claim 11, wherein the first multi-dimensional space is a two-dimensional space, the second multi-dimensional space is a three-dimensional space, and the common multi-dimensional space is a three-dimensional space.

13. The method of claim 12, wherein the at least one first multi-dimensional space point is extracted from a two-dimensional image and the at least one second multi-dimensional space point is extracted from a three-dimensional point cloud.

14. A non-transitory computer-readable medium having stored thereon at least one program, the at least one program including instructions which, when executed by a processor, cause the processor to perform a method for providing a real time, three-dimensional (3D) navigational map for platforms, the method comprising integrating at least two sources of multi-modal and multi-dimensional platform sensor information to produce a more accurate 3D navigational map by:

receiving both a 3D point cloud from a first sensor on a platform with a first modality and a 2D image from a second sensor on the platform with a second modality different from the first modality;

generating at least one first space semantic label and at least one first space semantic label uncertainty associated with at least one first space point in the 3D point cloud;

generating at least one second space semantic label and at least one second space semantic label uncertainty associated with at least one second space point in the 2D image; and determining if the at least one first space point and the at least one second space point represent a common point in a space surrounding the platform and, if so, fusing the at least one first space semantic label and the at least one first space semantic label uncertainty with the at least one second space semantic label and the at least one second space semantic label uncertainty to create fused 3D spatial information of the common point in the space surrounding the platform to enhance the 3D navigational map.

15. The non-transitory computer-readable medium of claim 14, further comprising:
incorporating temporal or motion related information from the first sensor or the second sensor into the fused 3D spatial information.

16. The non-transitory computer-readable medium of claim 14, further comprising:
performing a subsequent fusion of geo-referenced data, distance information, or velocity information with the fused 3D spatial information.

17. The non-transitory computer-readable medium of claim 14, further comprising:
periodically performing a joint inference on new and existing information from the first sensor and the second sensor to update the 3D navigational map.

18. The non-transitory computer-readable medium of claim 14, further comprising:
determining depth information from information from the first sensor or from information from the second sensor.

19. The non-transitory computer-readable medium of claim 14, further comprising:
fusing 3D information from the first sensor and 2D information from the second sensor using a joint deep-learning based 3D semantic segmentation process.

20. The non-transitory computer-readable medium of claim 14, further comprising:
using combined information from the first sensor and information from the second sensor to reason a complete and dense 3D scene by depth propagation or occlusion fill-in processes to enhance the 3D navigational map.

* * * * *